July 8, 1958 C. O. RANDALL ET AL 2,842,750
GEOPHONE CABLE
Filed Jan. 5, 1954 3 Sheets-Sheet 1
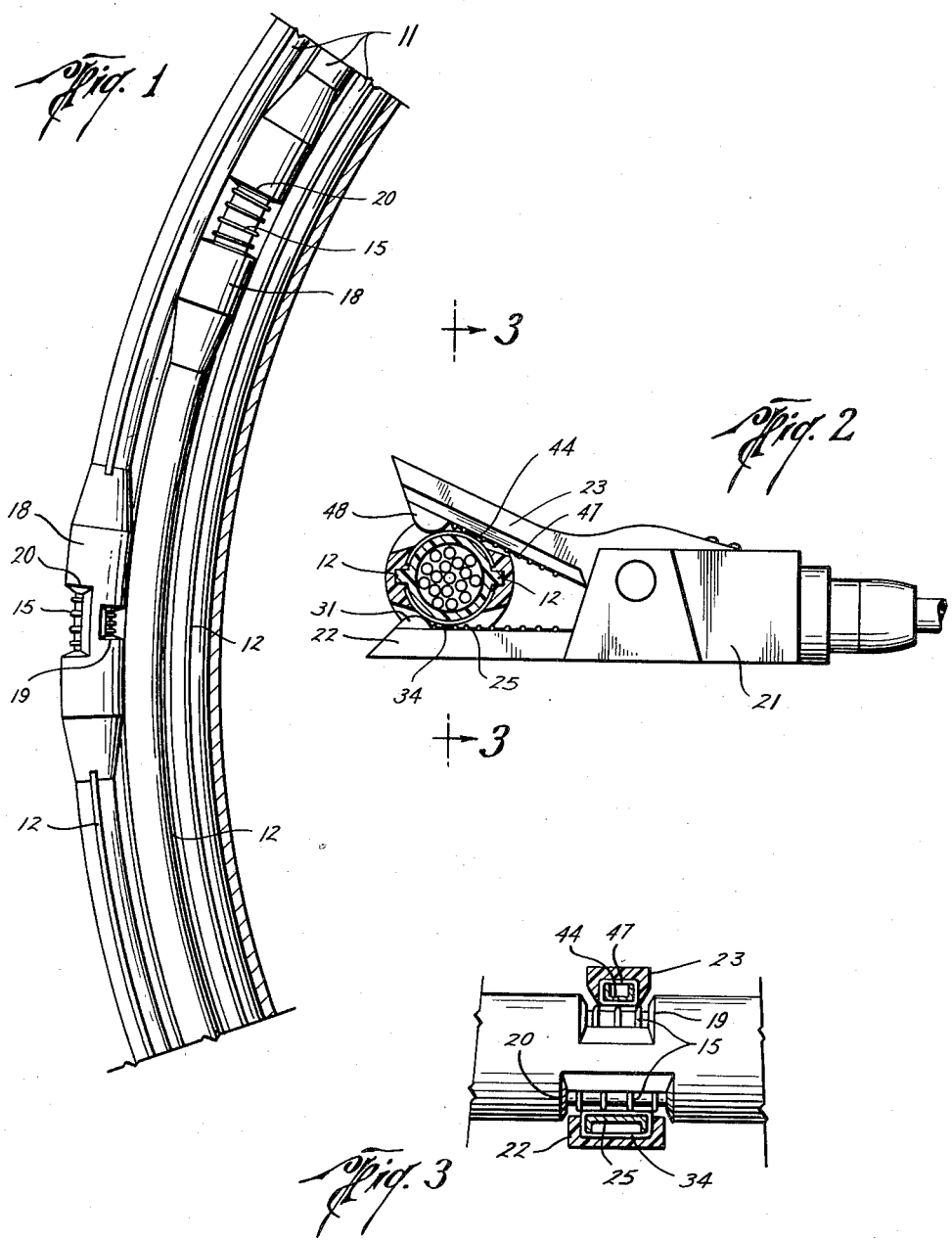
Lawrence D. Zepernick
Clifton O. Randall
INVENTORS
BY
ATTORNEYS July 8, 1958     C. O. RANDALL ET AL     2,842,750
GEOPHONE CABLE Filed Jan. 5, 1954     3 Sheets-Sheet 2

Lawrence D. Zepernick
Clifton O. Randall
INVENTORS

BY

ATTORNEYS

July 8, 1958

C. O. RANDALL ET AL 2,842,750

GEOPHONE CABLE

Filed Jan. 5, 1954

Lawrence D. Zepernick
Clifton O. Randall
INVENTORS

BY
*Browning Simms & Hyer*

ATTORNEYS

United States Patent Office 2,842,750
Patented July 8, 1958

2,842,750

GEOPHONE CABLE

Clifton O. Randall and Lawrence D. Zepernick, Houston, Tex., assignors to Vector Manufacturing Company, Houston, Tex., a partnership Application January 5, 1954, Serial No. 402,298

3 Claims. (Cl. 339—151)

This invention relates to a geophone cable for connecting one or more geophones to a recording apparatus and more particularly to a cable take-out to which a geophone lead may be connected.

In seismic exploration, it is common to employ a number of geophones strung out over a considerable distance. The geophones, which are provided with relatively short lead wires, are connected to a central recording station by a geophone cable extending from the recording station to a group of geophones. Such cable contains a number of pairs of wires and is usually strung from geophone to geophone.

In a simple straight line pattern, leads from each geophone are releasably attached to the cable at take-outs spaced along the cable. This arrangement allows the geophone to be detached from the cable and the cable to be wound on a reel to facilitate relocation of the cable and geophones. The location of the geophones may be changed several times daily. Each such change in location requires a restringing of the cable and the reattachment of the geophones to the cable. To facilitate this frequent reattachment it has been proposed to attach a geophone lead wire to a take-out by connecting one of the wires in the cable to a terminal surrounding the cable by gripping the contact between the jaws of a spring-pressed clip much the same as a clothespin engaging a wire. This has proved satisfactory in use, but it has been found that the stiff terminal surrounding the cable has tended to cause fatigue and failure of the wires in the cable due to the sharp bend in the cable at each end of the contact when the cable is wound on a reel.

Each geophone requires two lead wires and in the past it has been the practice to provide the geophone cable with a take-out for each geophone lead. In accordance with this invention both lead wires may be connected to the cable at a single take-out if desired.

It is an object of this invention to provide a geophone cable of the type referred to in which the cable is completely flexible.

Another object is to provide an electrical take-out of the type referred to which is sufficiently flexible to allow a smooth bend through the take-out when the cable is wound upon a reel.

Another object is to provide a cable of the type referred to wherein the take-out terminal will bend, contract, or expand to conform to a bend in the cable.

Another object is to provide a cable of the type referred to wherein each take-out has two terminals arranged circumferentially of the cable and insulated from each other.

Another object is to provide a cable of the type referred to wherein a flexible terminal is permanently connected to one of the wires in the cable in a manner which avoids an elongate, stiff joint about which a sharp bend might occur.

Other objects and advantages of this invention will be apparent to one skilled in the art from a consideration of the specification, claims and appended drawings.

In the drawings wherein there is shown an illustrative embodiment of this invention, and wherein like reference numerals indicate like parts:

Fig. 1 is a view in section of a fragment of a cable take-up reel with a cable constructed in accordance with this invention wound thereon illustrating the manner in which the cable take-outs will bend and conform to the contour of the cable when wound upon a reel, and further illustrating the manner in which the preferred form of terminal will contract and expand to allow a smooth bend in the cable at the take-outs;

Fig. 2 is a cross-sectional view through a cable take-out with a spring clip shown in elevation and gripping the take-out;

Fig. 3 is a view along the lines 3—3 of Fig. 2 further illustrating the coaction of the cable terminals and the bite faces of the clip jaws;

Figure 4:
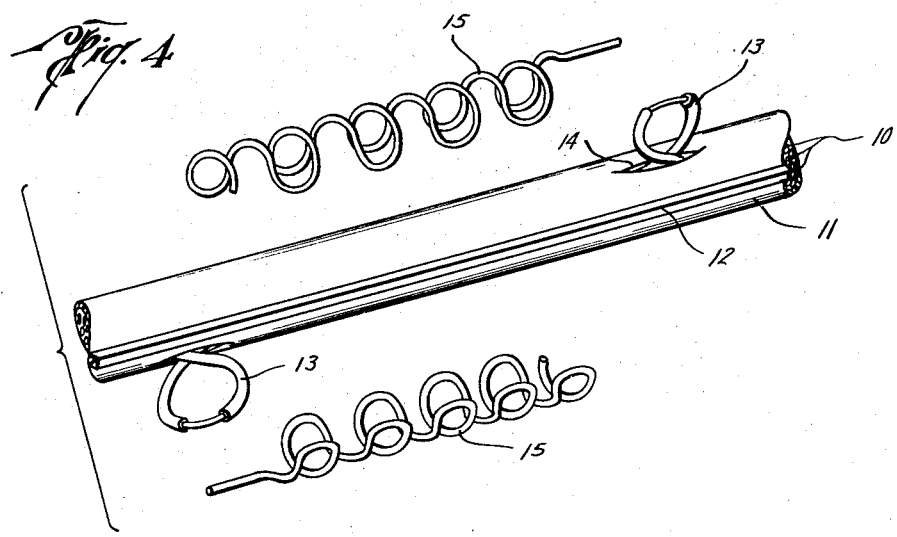
Fig. 4 is an exploded perspective view of a section of a geophone cable and a preferred form of terminals with loops of a pair of wires lifted out preparatory to being secured to the half-spring terminals.
Figure 5:
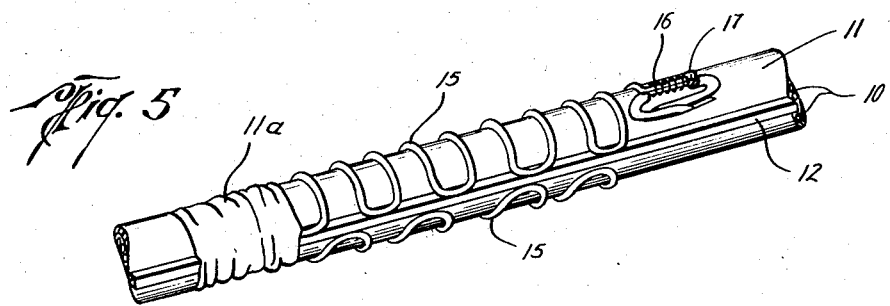
Fig. 5 is a perspective view of a partially assembled cable take-out illustrating one manner of connecting the terminals to the cable wires, and further illustrating the manner in which the terminals are held in place during completion of the fabrication process.
Figure 6:
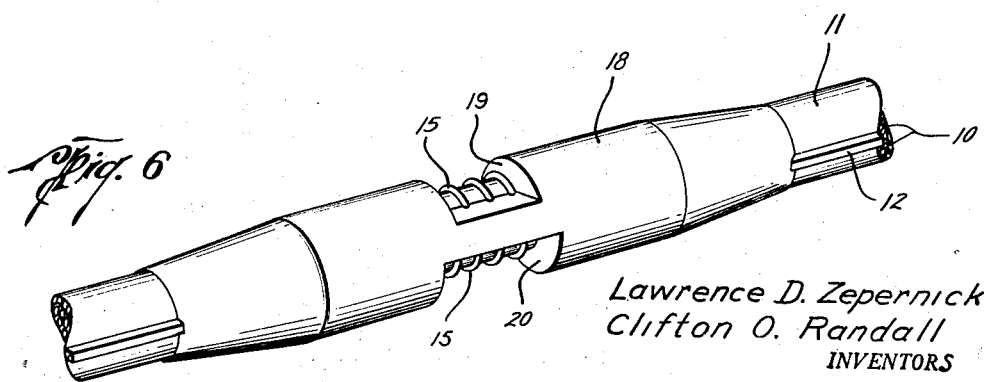
Fig. 6 is a perspective view of a completed cable take-out.

Referring to the drawings, and particularly to Figs. 4, 5 and 6, the geophone cable comprises a number of lead wires 10 covered by a suitable sheathing 11. Sheathing 11 should be a tough, flexible, waterproof material such as polyvinyl chloride, which has been found to be very satisfactory in use. In manufacturing the cable the lead wires are formed into a cable-like bundle and the sheathing 11 extruded therearound. For a purpose which will appear hereinafter it is desirable to provide ribs 12 along the outer periphery of the cable at the take-out points. If desired, ribs 12 may be formed when the cable is extruded about the bundle.

It is desirable to standardize the take-out and clip parts. When the cable has only a few leads and therefore is not of sufficient diameter to employ standard parts, a jacket of plastic material having similar characteristics to that used in the cable sheathing is molded about the cable at the take-out points to increase the diameter of the sheathing the desired amount. In such instance, the ribs 12 would not be formed on the cable sheathing but would be formed on the jacket of plastic material, the end result being similar to external appearance of cable 11.

During assembly of the wires into a bundle, the take-out points are selected and a pair of wires formed with loops 13. After the sheathing has been extruded over the bundle, the sheathing may be slit at the proper points and the loops lifted out through these slits 14 as illustrated in Fig. 4. This pair of wires may then be bared along a short distance preparatory to being secured to the take-out terminals. It will be understood that if but a single terminal is to be used only one wire would be looped and lifted out of the cable as explained above.

In accordance with this invention, there is provided a flexible terminal to be secured to the cable and to make contact with a geophone clip as will hereinafter appear. The terminal should be flexible in any direction, and preferably should be characterized by its ability to expand or contract as well as bend along its length dimension as this will permit the terminal to conform to the contour of the cable when wound upon a take-up reel. Such a terminal may conveniently be fabricated by winding a length of wire and preferably by bending a length of wire in a series of continuous S-turns. For convenience, the loops of the S may additionally be bent laterally about an arc of slightly less than 180° to form an elongate, winding terminal which will snugly embrace the cable. By forming the terminal on an arc of slightly less than 180° a pair of terminals may be arranged circumferentially about the cable and insulated from each other by a pair of ribs of insulating material. Preferably, the terminal is formed of spring wire which will tend to return to its original form after being distorted. Terminals 15 are Monel metal spring wires shaped in the manner explained above and may conveniently be termed "half-spring" terminals.

Insulation is skinned from a length of loop 13 and one end of terminal 15 fastened to the skinned wire. This connection may be made by crimping the terminal and wire together where hard wire such as copperplated steel is employed, but where soft copper wire is used a special connecting means is necessary as crimping causes occasional failure of the wire adjacent the crimp. Soldering a short length of the skinned wire to the terminal is also unsatisfactory as this results in a rigid member and continued flexure of the cable causes occasional failure of wire loops 13 adjacent the soldered joint. It has been discovered that a satisfactory joint can be made by wrapping the terminal 15 and wire loops 13 together with a fine strand of wire 16 (Fig. 5) and spot soldering wire 13, terminal 15 and the wrapping wire 16 together with a spot of solder 17.

After both terminals have been fastened to their respective loops 13, the terminals are laid against the cable and the ends of terminal 15 bound to the cable by several wraps of vinyl tape 11a. The wraps of tape 18 pass over the connections between terminals 15 and wire loops 13. This holds the terminals in proper position and prevents the free end of the wrapping wire 16 from unwrapping. Once the molded boot is applied the wrapping wire will be held against unwrapping but will permit limited relative movement of the connection between wire loops 13 and terminals 15. This type of connection has proved satisfactory and has eliminated premature failure of wire loops 13 at this point.

It will be noted that terminals 15 are spaced from each other by ribs 12 during assembly of the take-out. Ribs 12 together with the molded boot 18 effectively isolate terminals 15 and prevent them from ever contacting each other.

After terminals 15 are secured to cable 11, the cable is placed in a mold and a layer of flexible insulating material formed over the terminals to hold them in place and provide an insulating covering over the terminals except at a pair of windows as will appear below. Preferably, the flexible material is one which will bond with cable sheathing 11 and seal slits 14 against moisture. A molded boot of polyvinyl chloride has been used and found to be satisfactory.

Take-out windows 19 and 20 are formed by lands in the mold when boot 18 is applied. There will, of course, be a thin layer of boot material covering terminals 15 at the window when the take-out is removed from the mold. This thin layer may be removed by a wire brush or any other convenient means and should be removed from the space between the exposed sections of terminals 15 so that there will not be any lateral support for material incrusted upon the terminals. Window 19 extends circumferentially over considerably less than a semi-circle and should be spaced approximately midway betwen ribs 12 whereby the loops of terminals 15 adjacent ribs 12 will be covered by the boot and prevented from being snagged and pulled away from the cable. Window 20 is of similar circumferential dimension and spacing relative to ribs 12, and preferably is located directly opposite to window 19. With this arrangement the jaws of a single clothespin type clip can be placed in contact with the exposed terminals. It will be noted that window 20 is considerably wider than window 19. If the cable is employed with clips whose jaws are correspondingly dimensioned, reverse connection of the clips to the cable will be impossible.

By reference to Fig. 1, it will be noted that when the cable is wound on a reel the take-outs bend with the cable. The terminals 15 bend and expand on the outside of the bend, and bend and contract on the inside of the bend. Thus, terminals 15 conform to the contour of the wound cable and will not cause a sharp bend in wires 10.

Referring to the geophone clip illustrated, the clip includes a base 21 which carries a fixed jaw 22 and a movable jaw 23. The jaws are urged toward closed position by spring 24 and are provided with contacts 25 and 26 in the fixed and movable jaw, respectively. Contacts 25 and 26 are insulated from each other except across their bite faces, as will appear below, and establish contact between terminals 15 and a pair of wires leading to a geophone when the clip is fastened to a cable take-out.

Figure 7:
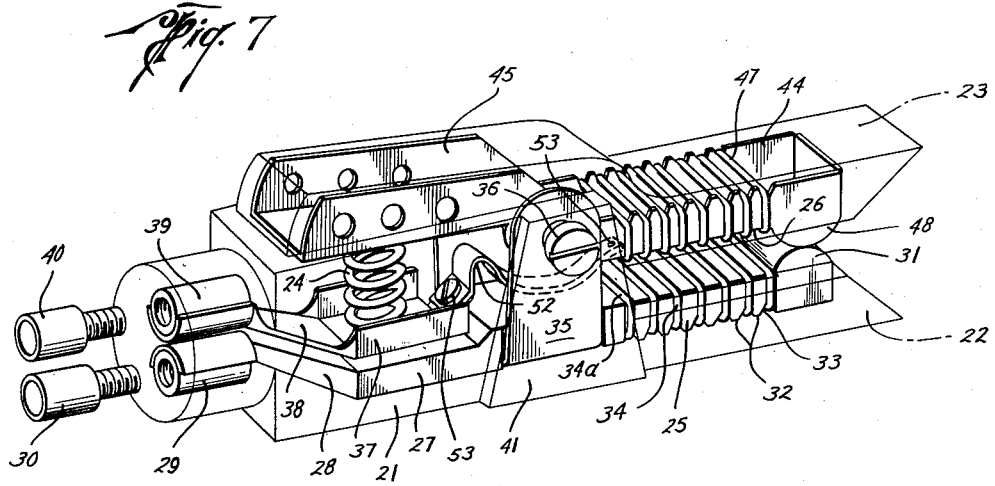
Fig. 7 is a perspective view of a spring clip which is preferred for use with the cable of this invention with the metal parts of the clip shown in solid lines and the plastic portion of the clip shown in phantom.

Referring particularly to Fig. 7, the base 21 includes a metallic member 27. An extension 28 of member 27 terminates in a connector 29 to which may be threadedly connected geophone lead 30. Metallic member 27 extends into fixed jaw 22 and this extension comprises contact 25. Preferably, contact 25 terminates at the free end of the jaw in a transverse ridge 31 projecting from the bite face 25a of contact 25 necessitating the further opening of the jaws before the clip can be removed from a cable take-out. The back side of contact 25 is provided with lands and grooves 32 and 33, respectively. A length of wire 34 is wrapped about contact 25 and spaced therealong by lands 32 to provide spaced protrusions 34a on the bite face of jaw 25. Preferably, wire 34 is a hard, corrosive-resistant conductor such as Monel metal. Protrusions 34a protect contact 25 against wear. These protrusions also tend to clean the surface of terminals 15 while being secured to the cable and tend to cut through any incrusted material on the take-out terminals 15 to effect a good contact. The protrusions also reduce the effective contact face of contact 25 to give a low area-high pressure contact.

When the illustrated clip and take-out are to be used together the exposed portions of take-out terminals 15 and protrusions 28a should cross each other when the clip is properly positioned on the cable. Figs. 2 and 3 illustrate the manner in which contact will be made between terminals 15 and protrusions 28a, and it is pointed out that there will be no lateral support for incrusted material on either the take-out or clip and the terminals will bite through and make contact.

Metallic member 27 has secured thereto an upstanding shackle 35 which carries hinge pin 36. Movable jaw 23 is mounted on this hinge pin for rotation thereabout. A metallic contact plate 37 is positioned in base 21 and spaced above metallic member 27. Plate 37 carries extension 38 which terminates in a connector 39 to which may be threadedly connected geophone lead 40.

Figure 8:
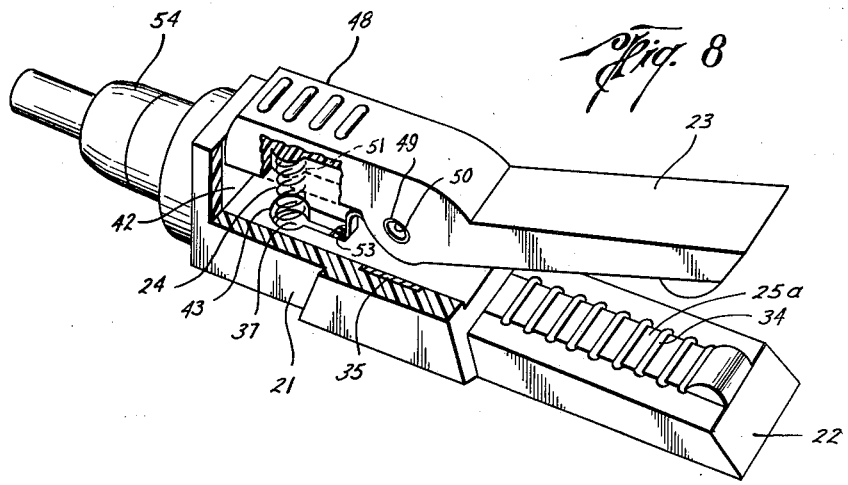
Fig. 8 is a perspective view of the clip of Fig. 7 with parts broken away to illustrate certain details of the clip.

The metallic parts of the base are carried by a molded body of plastic material 41 which may be polyvinyl chloride. This plastic body insulates plate 37 and its associate receptacle 39 from the remaining metallic parts and provides an outer covering to prevent accidental grounding of the clip. As shown in Fig. 8, the molded plastic body of the clip is shaped to provide a large well 42 which receives the thumb piece of the movable jaw. A small well 43 is provided in the bottom of well 42 and exposes the upper surface of plate 37 so that electrical contact may be made between plate 31 and the movable jaw through spring 24 which seats in well 43. Of course, the receptacles 30 and 40 as well as the contact face 25a of contact 25 are left exposed.

A plastic covered, metallic, structural member 44 provides the movable jaw 23 and a thumb piece 45 for actuating the jaw. Structural member 44 is exposed on its nether side to provide contact 26. Spaced protrusions are provided on the bite face of the movable jaw by wraps of wire 47 which are spaced in the same manner as wire 34 on the fixed jaw. The free end of contact 26 also terminates in a lateral ridge 48 which engages ridge 31 when the jaws are closed to short circuit the geophones. This short circuit feature is highly desirable as the current inducted in the circuit during transporting of the phones will dampen movement of the spring in the phone and prolong its life as will be well understood by those skilled in the art.

Movable jaw 23 is provided with a bore 49 in which there is positioned an insulating bearing 50. Pin 36 passes through bearing 50 and thumb piece 45 is received in well 42 in a manner permitting hinging action of the movable jaw about hinge pin 50.

Structural member 44 is completely covered with plastic material, except for the bite face of the jaw and a well 51 which receives one end of spring 24. This plastic material is preferably a very tough plastic such as polystyrene. Wells 51 and 37 serve to maintain spring 24 in proper position. Electrical contact between plate 37 and contact 26 is also provided by spring 24.

To insure complete electrical contact between contact 26 and plate 37 at all times, there is provided a leaf spring 52 which is permanently secured at one of its ends to contact 26 by pin 53, and releasably secured to plate 37 at its other end by screw 53.

In assembling the clip, leaf spring 52 is first secured to plate 37 and then spring 24 is positioned in its wells. Pin 36 may then be inserted and secured in place in any desired manner.

After leads 30 and 40 have been secured to receptacles 29 and 39, a covering 54 of plastic material such as polyvinyl chloride may be applied to waterproof these connections.

Referring to Fig. 3, it is pointed out that movable jaw 23 is considerably narrower than fixed jaw 22 and that the jaws are dimensioned to substantially correspond to the widths of windows 19 and 20. With this arrangement it is impossible to reverse connect the clip to the cable and the polarization of the geophones with the recording instrument is insured.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A geophone cable comprising, a plurality of separately insulated wires in a common sheathing, a flexible length of wire formed in continuous S-turns, said flexible length of wire providing a terminal and extending along and overlying a portion of the sheathing on one side of a plane passing through the cable and extending in the direction thereof, said terminal being in electrical communication with one of said insulated wires, and means securing each end of the terminal to the sheathing.

2. A geophone cable comprising; a plurality of separately insulated wires in a common sheathing; first and second flexible, elongate, winding wires extending along and overlying the cable on opposite sides of a plane passing through the cable and extending in the direction thereof; said winding wires opposed to each other on the cable; means insulating the winding wires from each other; means electrically connecting the winding wires to insulated wires in the cable; and means securing the winding wires to the sheathing.

3. The cable of claim 2 wherein the winding wires are secured to the insulated wires by strains of wire wrapped about a portion of a winding wire and a portion of an insulated wire, and the three wires are spot soldered together.

References Cited in the file of this patent

UNITED STATES PATENTS

| | | |
|---|---|---|
| 1,002,448 | Putnam | Sept. 5, 1911 |
| 1,708,165 | Willat | Apr. 9, 1929 |
| 2,060,914 | Weaver et al. | Nov. 14, 1936 |
| 2,062,886 | Jensen | Dec. 1, 1936 |
| 2,253,830 | Winterhalter | Aug. 26, 1941 |
| 2,753,535 | Miller et al. | July 3, 1956 |
| 2,754,489 | Randall et al. | July 10, 1956 |